(12) United States Patent
Forster

(10) Patent No.: US 10,387,763 B2
(45) Date of Patent: Aug. 20, 2019

(54) SYSTEMS AND METHODS FOR IMPROVING PERFORMANCE OF RFID TAGS

(71) Applicant: AVERY DENNISON RETAIL INFORMATION SERVICES, LLC, Mentor, OH (US)

(72) Inventor: Ian J. Forster, Chelmsford (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 15/828,584

(22) Filed: Dec. 1, 2017

(65) Prior Publication Data

US 2018/0157953 A1 Jun. 7, 2018

Related U.S. Application Data

(60) Provisional application No. 62/428,869, filed on Dec. 1, 2016.

(51) Int. Cl.
*G06K 19/07* (2006.01)
*G06K 19/077* (2006.01)

(52) U.S. Cl.
CPC ..... *G06K 19/07773* (2013.01); *G06K 19/077* (2013.01); *G06K 19/0726* (2013.01)

(58) Field of Classification Search
CPC ............. G06K 19/0726; G06K 19/077; G06K 19/07773
USPC ......................................................... 235/492
See application file for complete search history.

(56) References Cited

U.S. PATENT DOCUMENTS

| | | | |
|---|---|---|---|
| 5,084,699 A | 1/1992 | DeMichele | |
| 6,118,379 A | 9/2000 | Kodukula et al. | |
| 6,343,744 B1 | 2/2002 | Shibata et al. | |
| 6,456,228 B1 * | 9/2002 | Granhed | H01Q 1/22 342/42 |

(Continued)

FOREIGN PATENT DOCUMENTS

DE 102012211188 1/2014

OTHER PUBLICATIONS

International Search Report and Written Opinion of the ISA/EPO prepared for PCT/US2017/064110 dated Mar. 9, 2018.

*Primary Examiner* — Seung H Lee
(74) *Attorney, Agent, or Firm* — Avery Dennison Retail Information Services, LLC

(57) ABSTRACT

Disclosed herein are RFID tags. In one exemplary embodiment, the RFID tag includes an RFID chip; a first antenna segment secured to the RFID chip; a second antenna segment secured to the RFID chip; and a wire segment secured on a first end to the first antenna segment and secured on a second end to the second antenna segment. Generally, the wire segment spans a mounting position of the RFID chip. In one embodiment, the wire segment is secured to the first antenna segment and the second antenna segment with ohmic contacts. The ohmic contacts can be formed by a conductive adhesive, soldering, or welding. In another embodiment, the RFID tag further includes a first non-conductive material positioned between the first end of the wire segment and the first antenna segment, and a second non-conductive material positioned between the second end of the wire segment and the second antenna segment.

18 Claims, 8 Drawing Sheets

(56) References Cited

U.S. PATENT DOCUMENTS

| | | |
|---|---|---|
| 7,095,372 B2 | 8/2006 | Soler Castany et al. |
| 7,102,520 B2 | 9/2006 | Liu et al. |
| 7,175,084 B2 | 2/2007 | Mennecart et al. |
| 7,183,994 B2 | 2/2007 | Weigand |
| 7,439,863 B2 | 10/2008 | Suzuki et al. |
| 7,546,671 B2 | 6/2009 | Finn |
| 7,768,457 B2 | 8/2010 | Pettus et al. |
| 8,322,624 B2 | 12/2012 | Finn |
| 9,154,188 B2 | 10/2015 | Finocchiaro et al. |
| 2002/0071940 A1* | 6/2002 | Arnold .............. B29C 45/14811 428/195.1 |
| 2005/0024287 A1* | 2/2005 | Jo ....................... G06K 19/0726 343/822 |
| 2006/0009251 A1 | 1/2006 | Nada et al. |
| 2006/0290588 A1* | 12/2006 | Forster .................. B60C 23/04 343/806 |
| 2007/0040028 A1* | 2/2007 | Kawamata ....... G06K 19/07749 235/435 |
| 2007/0146140 A1 | 6/2007 | Nagao et al. |
| 2007/0164868 A1* | 7/2007 | Deavours ........ G06K 19/07749 340/572.7 |
| 2007/0200705 A1* | 8/2007 | Yamagajo .......... G06K 19/0726 340/572.7 |
| 2008/0018477 A1 | 1/2008 | Forster et al. |
| 2008/0068175 A1* | 3/2008 | Hockey .............. G06K 19/0726 340/572.7 |
| 2008/0143535 A1* | 6/2008 | Fischer ................ H01Q 1/2225 340/572.7 |
| 2008/0157976 A1* | 7/2008 | God ................ G06K 19/07749 340/572.7 |
| 2008/0180328 A1* | 7/2008 | Yamagajo ........ G06K 19/07786 343/700 MS |
| 2009/0096696 A1* | 4/2009 | Joyce, Jr. ............ H01Q 1/2225 343/793 |
| 2009/0295645 A1 | 12/2009 | Campero et al. |
| 2010/0097191 A1* | 4/2010 | Yamagajo ........... H01Q 1/2225 340/10.1 |
| 2010/0156736 A1* | 6/2010 | Chung ................ H01Q 1/2208 343/793 |
| 2010/0225482 A1 | 9/2010 | Kasai et al. |
| 2010/0321161 A1* | 12/2010 | Isabell .................... D06H 1/00 340/10.1 |
| 2011/0017832 A1* | 1/2011 | Ritamaki ........... G06K 19/0773 235/492 |
| 2011/0220727 A1* | 9/2011 | Lee ..................... H01Q 1/2208 235/492 |
| 2012/0013469 A1* | 1/2012 | Kai .................... G06K 19/0779 340/572.7 |
| 2012/0092027 A1 | 4/2012 | Forster |
| 2012/0182147 A1 | 7/2012 | Forster |
| 2012/0241521 A1* | 9/2012 | Kim .................... H01Q 1/2225 235/492 |
| 2014/0027520 A1* | 1/2014 | Kato .................... H04B 5/0075 235/492 |
| 2014/0209690 A1* | 7/2014 | Teng .................... G06K 19/027 235/492 |
| 2015/0108221 A1* | 4/2015 | Akamatsu ............... H01Q 1/38 235/488 |
| 2017/0308782 A1* | 10/2017 | Burkholder .......... G06K 19/077 |
| 2018/0039878 A1* | 2/2018 | Akamatsu ............ G06K 19/077 |

* cited by examiner

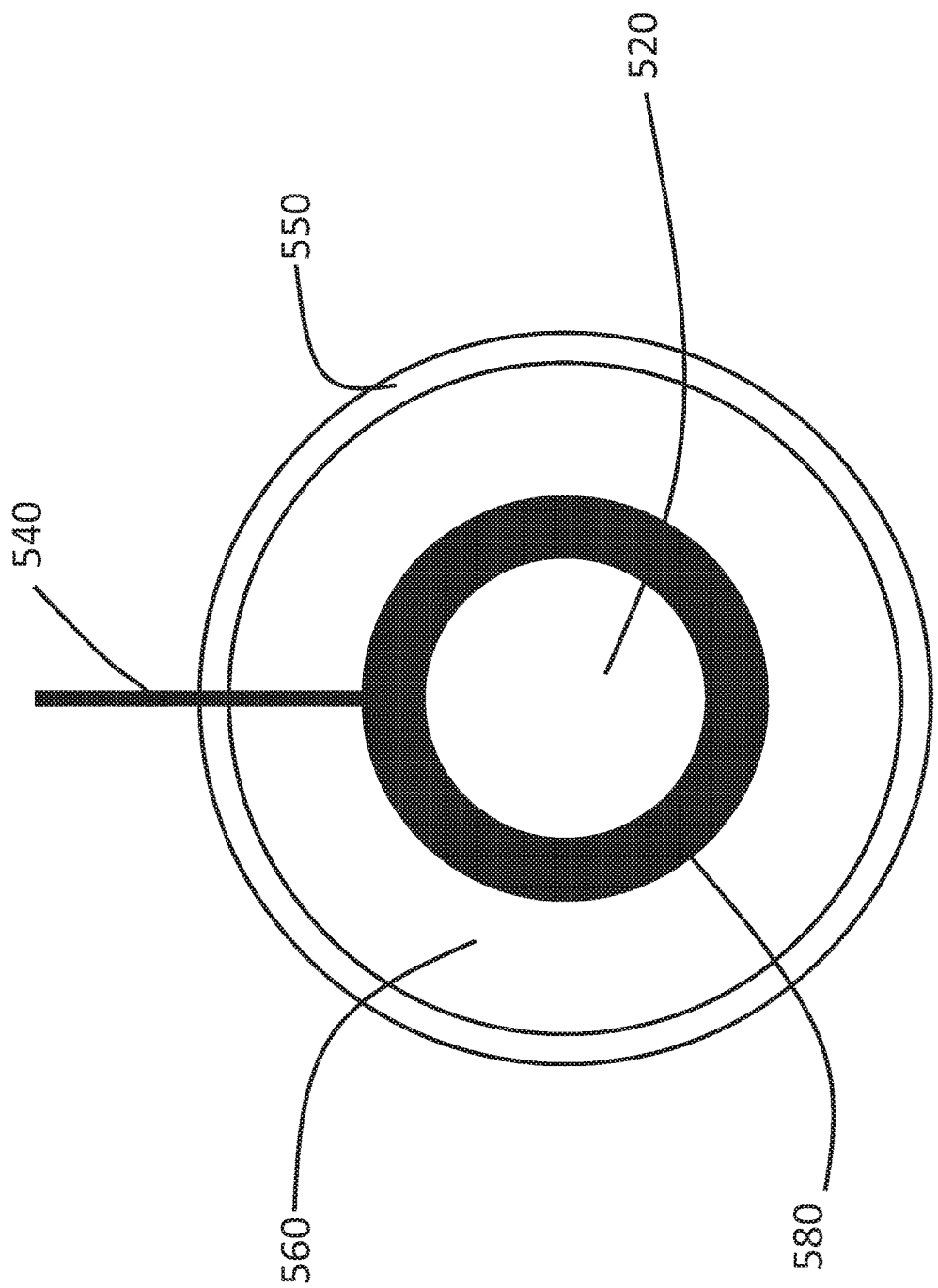

SYSTEMS AND METHODS FOR IMPROVING PERFORMANCE OF RFID TAGS

CROSS REFERENCE TO RELATED APPLICATION(S)

The present application claims priority to and the benefit of U.S. Provisional Patent Application No. 62/428,869 filed Dec. 1, 2016, which is incorporated herein by reference in its entirety.

FIELD OF INVENTION

The present disclosure generally relates to systems and methods for improving the match between an RFID chip and antenna segments in an RFID tag. More specifically, the present disclosure relates to systems and methods that include an additional structure such as a wire segment spanning an RFID chip mounting position to improve the match between the RFID chip and antenna segments in an RFID tag.

BACKGROUND

Radio frequency identification ("RFID") tags are well known in the art. RFID tags typically include an RFID chip and an antenna secured to the RFID chip. The RFID chip can be encoded with information and other data, which can be retrieved as necessary through interrogation by an RFID reader. To interrogate an RFID tag, typically an RFID reader directed an electrical signal toward an RFID tag. The antenna of the RFID tag receives the electrical signal and propagates the electrical signal to the RFID chip. The electrical signal continues through the RFID chip, acquiring the information or data encoded on the RFID chip, and continues again through the antenna and returns to the RFID reader. The RFID reader can then interpret the information returned from the RFID chip and use such information as needed. It will be appreciated that the more efficiently the RFID tag manages the electrical signal sent by the RFID reader, the greater the effective range of the RFID tag.

RFID tags are used in a variety of industries including transportation, retail, inventory control, manufacturing and the like. An RFID tag can be attached to articles or items and can include information encoded on the RFID tag about those articles or items. RFID readers can interrogate the RFID tags and learn important or even critical information about the article or item.

A typical RFID tag 10 is illustrated in FIG. 1. The RFID tag 10 includes an RFID chip 20 mounted between two extended members 30, 40. In the prior art embodiment of FIG. 1, the two extended members 30, 40 are made of metal wire and form an antenna. Metal wire is a suitable material for an antenna for an RFID tag because metal wire is typically strong, flexible and a good conductor of radio frequency energy.

As illustrated in FIG. 1, when the RFID chip 20 is mounted between two sections of wire 30, 40 it forms a dipole. However, the known impedance of such a dipole results in suboptimal power transfer between the wire segments 30, 40 and the RFID chip 20. Such suboptimal power transfer can be caused by a loss of power due to reflection of power at the intersection of the RFID chip 20 and the wire segments 30, 40. Such a condition is commonly referred to as a mismatch between the RFID chip and the antenna. It will be understood that the loss of power will reduce the operating range of an RFID tag, and thus, negatively affect the performance of the RFID tag.

There is a need for improved performance for RFID tags. Specifically, there is a need for improved RFID tags to reduce or eliminate mismatch issues between RFID chips and accompanying antennas.

SUMMARY

Disclosed herein are RFID tags. In one exemplary embodiment, the RFID tag includes an RFID chip; a first antenna segment secured to the RFID chip; a second antenna segment secured to the RFID chip; and a wire segment secured on a first end to the first antenna segment and secured on a second end to the second antenna segment. Generally, the wire segment spans a mounting position of the RFID chip. In one embodiment, the wire segment is secured to the first antenna segment and the second antenna segment with ohmic contacts. The ohmic contacts can be formed by a conductive adhesive, soldering, or welding. In another embodiment, the RFID tag further includes a first non-conductive material positioned between the first end of the wire segment and the first antenna segment, and a second non-conductive material positioned between the second end of the wire segment and the second antenna segment.

In another exemplary embodiment, an RFID tag includes an RFID chip; a first antenna segment secured to the RFID chip; a second antenna segment secured to the RFID chip; a tuning and matching element secured on a first end to the first antenna segment and secured on a second end to the second antenna segment; and a sleeve positioned over the RFID chip and a portion of the first antenna segment and the second antenna segment. The tuning and matching element includes a first ring at the first end, a second ring a the second end, and a wire section connecting the first ring and the second ring. In one embodiment, the tuning and matching element is secured to the first antenna segment by the first ring and secured to the second antenna segment by the second ring. In one embodiment, the wire section is generally a straight segment, and in another embodiment, the wire section is generally a spiral segment. In another embodiment, an adhesive positioned to fill the sleeve and secure the first and second antenna segments to the RFID chip.

BRIEF DESCRIPTION OF THE DRAWINGS

In the accompanying drawings, structures are illustrated that, together with the detailed description provided below, describe example embodiments of the disclosed methods. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

FIG. 8 schematically illustrates the RFID tag of FIG. 6.

DETAILED DESCRIPTION

The methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques arrangements, method, etc. are either related to a specific example presented or are merely a general description of such a technique, arrangement, method, etc. identifications of specific details or examples are not intended to be and should not be construed as mandatory or limiting unless specifically designated as such. Selected examples of apparatus, arrangement, and methods for improving the match between RFID chips and antenna segments in RFID tags are hereinafter disclosed and described in detail with reference made to FIGS. 1-8.

As will be described in detail, embodiments disclosed herein provide for novel systems and methods for improving the match between RFID chips and antenna segments in RFID tags. The components of an exemplary systems and methods will be first described in detailed, followed by detailed description of how such components.

Figure 1:
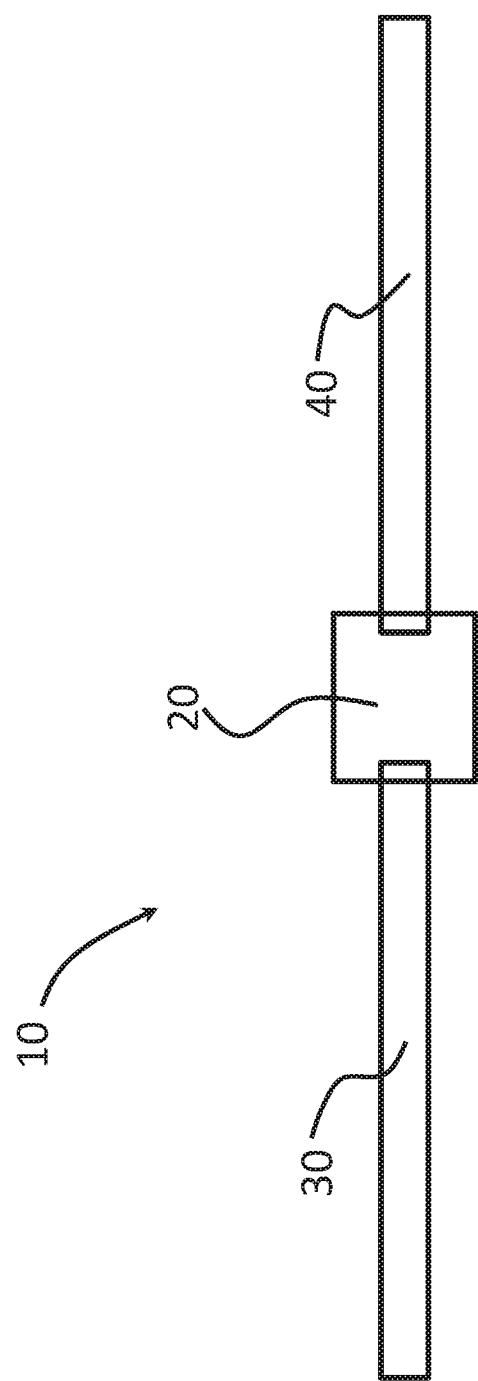
FIG. 1 schematically illustrates a prior art RFID tag.
Figure 2:
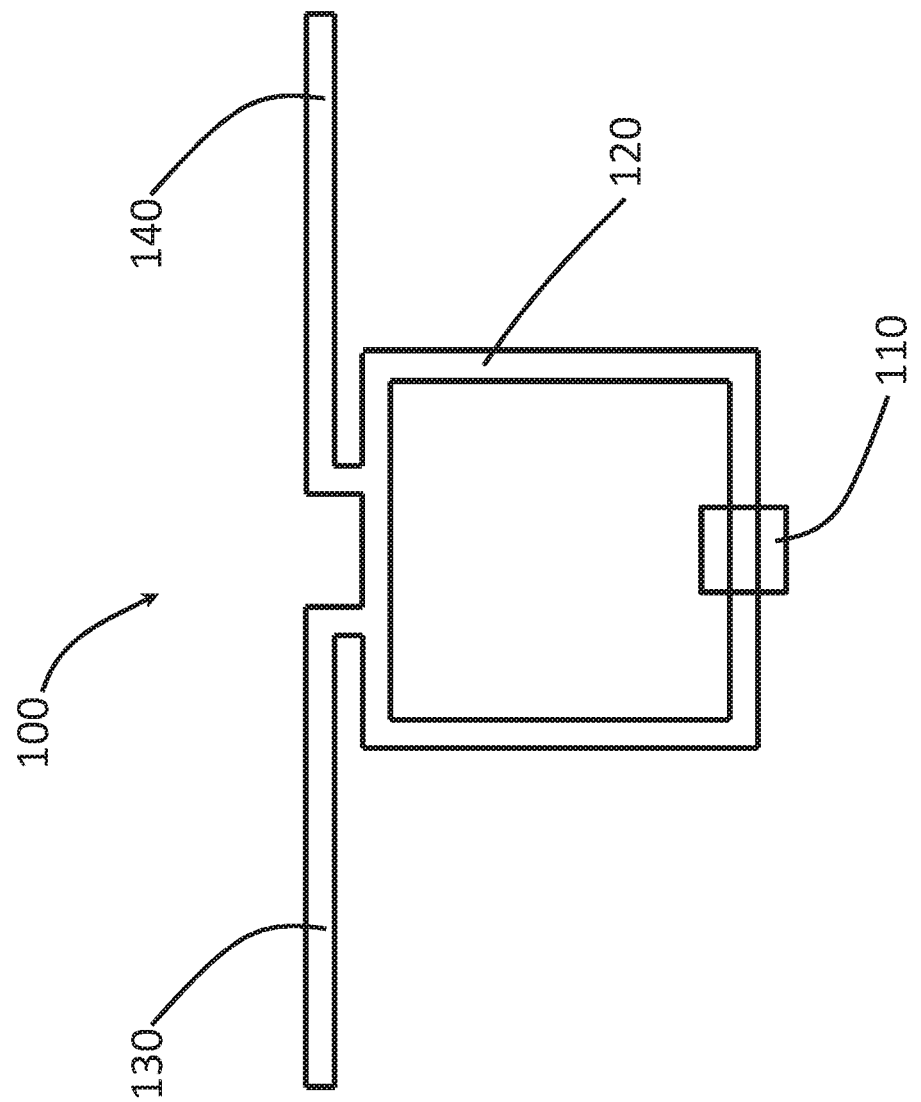
FIG. 2 schematically illustrates an RFID tag with an RFID chip mounted on a loop to improve the match between the RFID chip and an antenna.

FIG. 2 illustrates an exemplary embodiment of an RFID tag 100 that includes RFID chip 110 and a loop 120, also referred to as a conductive track. The RFID chip 100 is mounted to and in electrical communication with the loop 120. A pair of antenna elements 130, 140 are connected to points along the loop 120. Such an arrangement improves the match between the RFID chip 110 and antenna elements 130, 140 as compared to the prior art. A matching network is formed by the combination of "loop tuning" and the points at which the antenna are connected to the loop 120, which improves the match between the RFID chip 110 and the antenna elements 130, 140 thus, improving the performance of the RFID tag 100. It will be understood that the formation of matching networks that reduced mismatches improve RFID tags and their performance.

Figure 3:
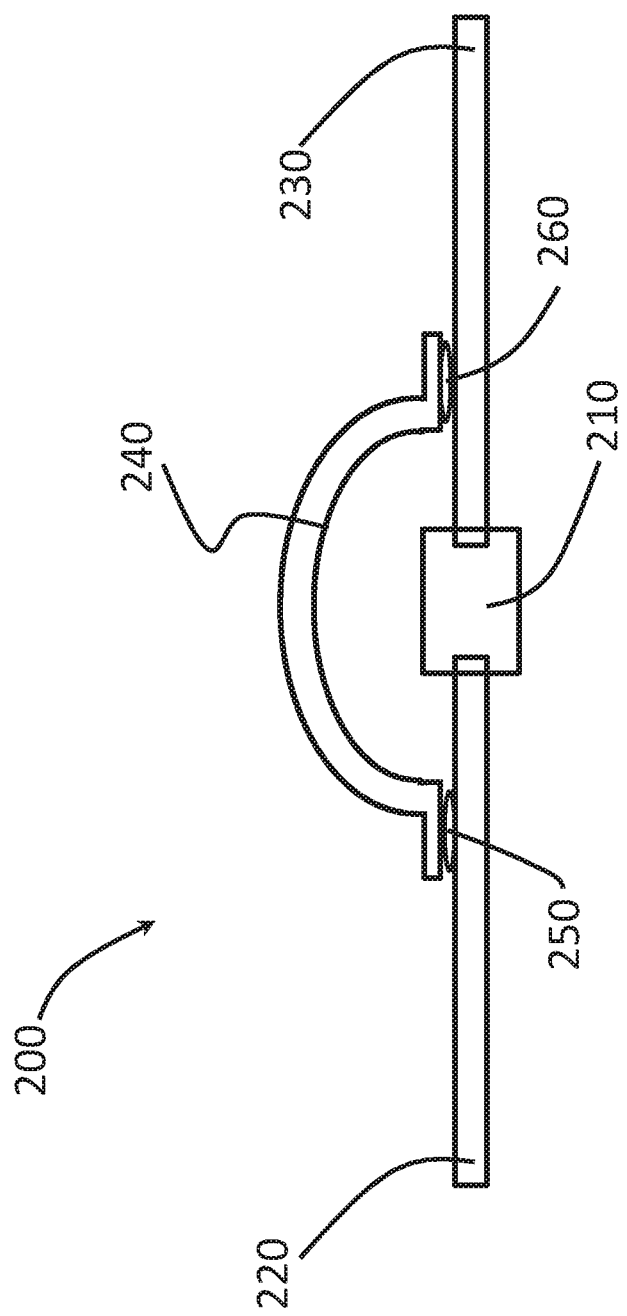
FIG. 3 schematically illustrates an RFID tag that includes a wire segment, secured to antenna segments, spanning an RFID chip mounting position to improve the match between the RFID chip and the antenna.

One method of improving the match between the an RFID chip and antenna segments is to span the RFID chip mounting position with a conductive element to form a matching network. One exemplary embodiment of such a method is illustrated in FIG. 3. The RFID tag 200 includes an RFID chip 210 coupled to a first extending antenna segment 220 and a second extending antenna segment 230. A wire segment 240 is coupled on a first end to the first extending antenna segment 220, and coupled on a second end to the second extending antenna segment 230. The wire segment 240 spans the mounting position of the RFID chip 220 and forms a matching network. Such a matching network forms a tuning loop. The coupling of the wire segment 240 to the first and second extended antenna segments 220, 230 can be formed by an ohmic contact. FIG. 3 illustrates such ohmic contacts, where the connections 250, 260 between the wire segment 240 and the first and second extended antenna segments 220, 230 are formed, for example, by conductive adhesive, soldering, cold welding, hot welding, and the like.

It will be understood that in embodiments of RFID tags, the coupling between wire segments and antenna segments can be electronic, magnetic, or a combination of electronic and magnetic fields.

Figure 4:
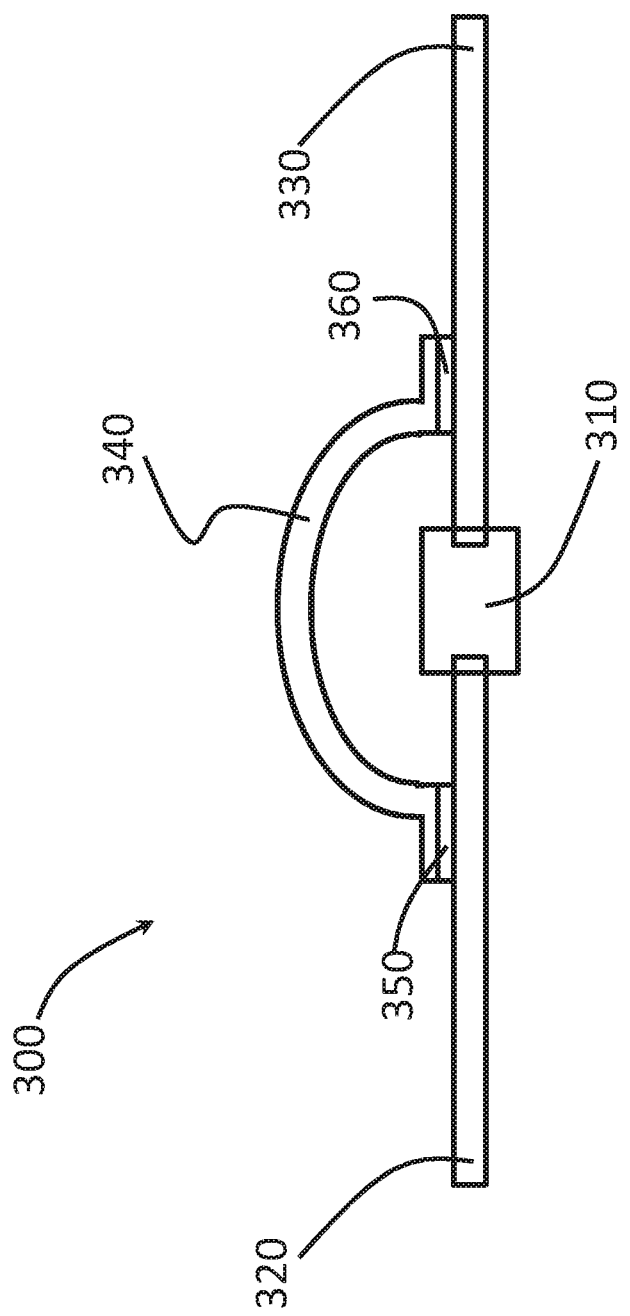
FIG. 4 schematically illustrates an RFID tag similar to FIG. 3 that includes non-conductive material between the wire segment and the antenna segments.

FIG. 4 illustrates a method of placing additional wire segments proximate to antenna segments. The RFID tag 300 of FIG. 4 includes an RFID chip 310 mounted between a first antenna segment 320 and a second antenna segment 330, with a wire segment 340 spanning the RFID chip mounting position. A first end of the wire segment 340 is placed in close proximity to the first antenna segment 320, and a second end of the wire segment 340 is placed in close proximity to the second antenna segment 330. In such an arrangement, a gap is formed between the wire segment 340 and the first and second antenna segments 320, 330. A first non-conductive material 350 is placed between the first end of the wire segment 340 and the first antenna segment 320. A second non-conductive material 360 is placed between the second end of the wire segment 340 and the second antenna segment 330. As will be understood, the coupling between the wire segment 340 and the first and second antenna segment 320, 330 can be a magnetic coupling, a capacitance coupling, or a combination of the two.

Figure 5:
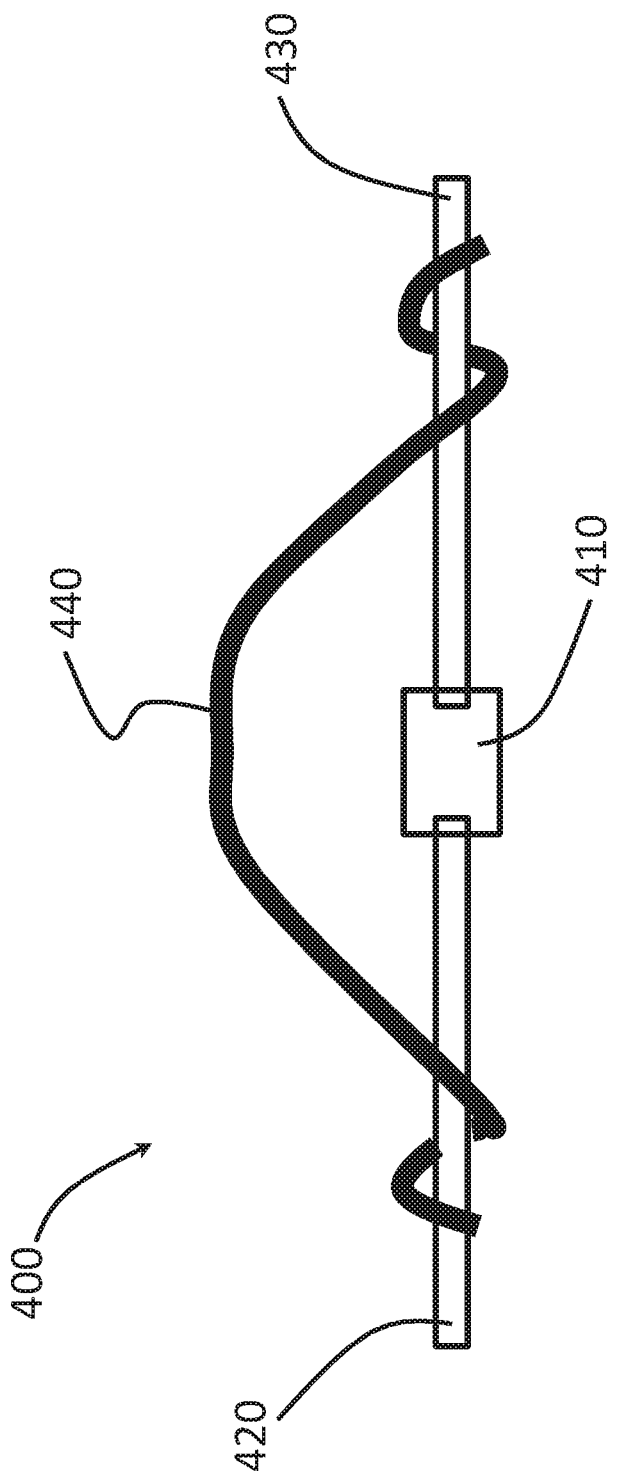
FIG. 5 schematically illustrates another RFID tag that includes a wire segment, secured to antenna segments, spanning an RFID chip mounting position to improve the match between the RFID chip and the antenna.

FIG. 5 illustrates another embodiment of an RFID tag 400. The RFID tag 400 includes an RFID chip 410 mounted to first and second antenna segments 420, 430. A wire segment 440 spans the RFID chip mounting position, where a first end of the wire segment 440 is wrapped around the first antenna segment 420 and a second end of the wire segment 440 is wrapped around the second antenna segment 430. To improve performance of the RFID tag 400, the pitch of the winding of the wire segment 440 can be varied along the length of the antenna segments 420, 430. For example, the wind can be tight near the points of maximum coupling to facilitate the loop tuning. A larger pitch wind can be used to make it easier to secure the wire segment over the area where the RFID chip 410 is mounted.

Wires as described herein can be both mechanically and electrically coupled. The mechanical characteristics of the composite in the central area can be modified to provide, for example, strain relief for the joints between the RFID chip and the antenna segments or to prevent sharp bends from being applied.

Figure 6:
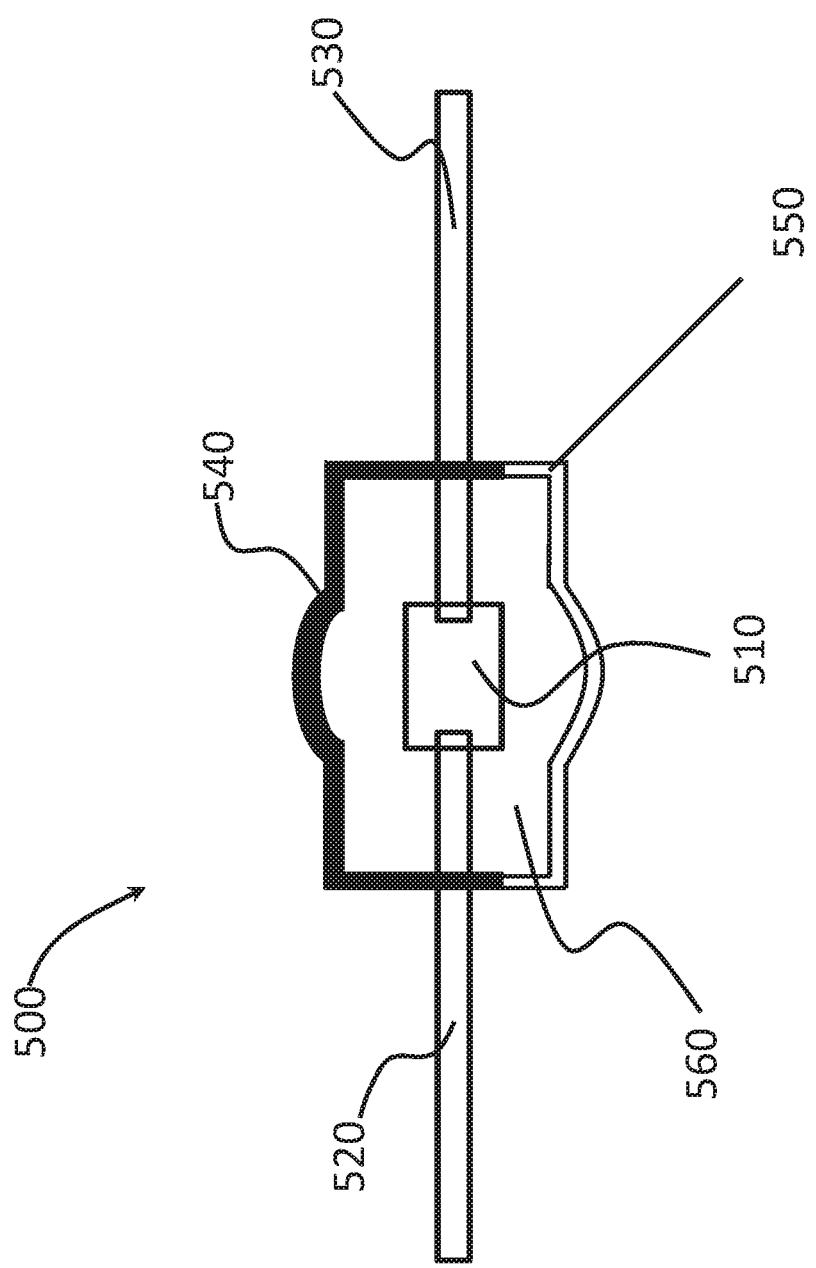
FIG. 6 schematically illustrates an RFID tag that includes a tuning/matching element positioned in a sleeve placed over an RFID chip to improve the match between the RFID chip and the antenna.
Figure 7:
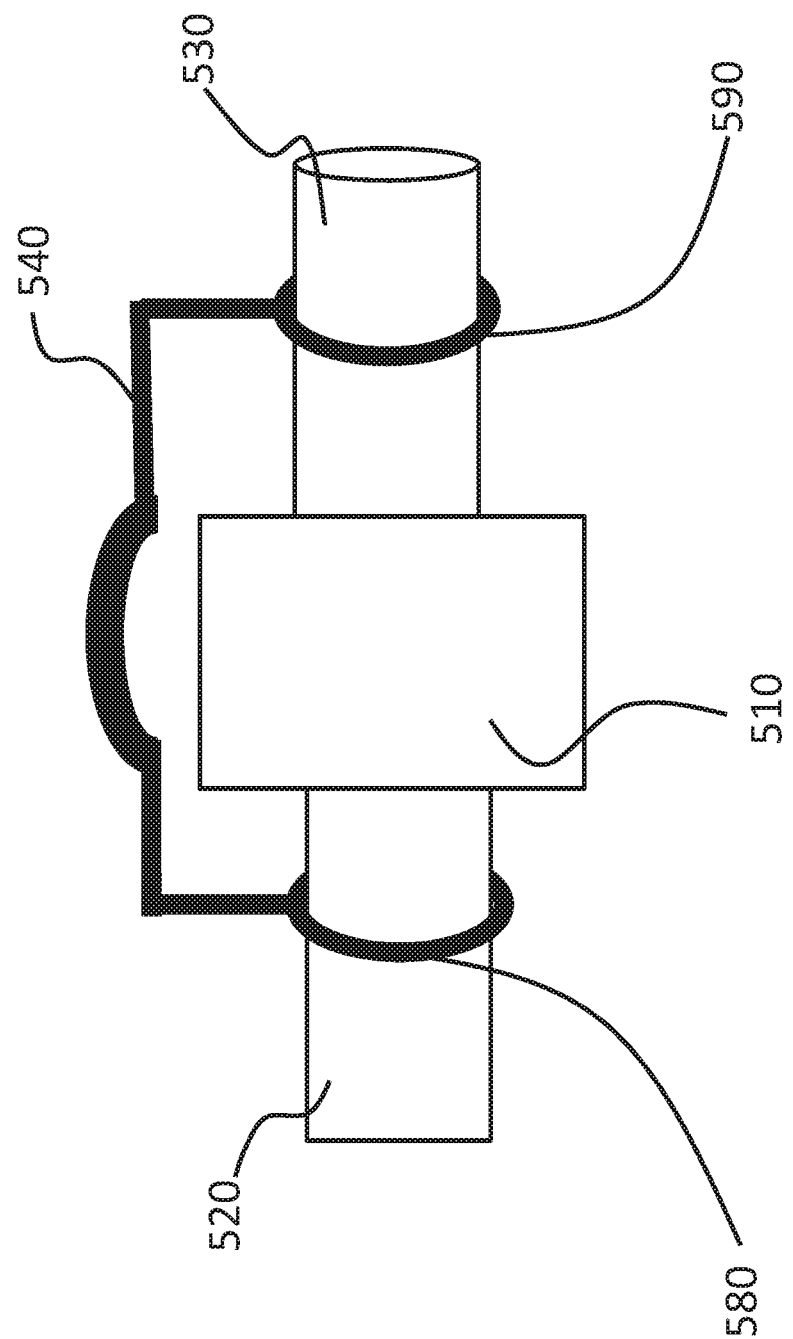
FIG. 7 schematically illustrates the RFID tag of FIG. 6.

FIGS. 6-8 illustrate another embodiment of an RFID tag 500. The RFID tag 500 includes an RFID chip 510 mounted to first and second antenna segments 520, 530. In this embodiment, a tuning/matching element 540 is within a sleeve 550 that slides over the RFID chip 510 and a portion of the antenna segments 520, 530. As is illustrated, the tuning/matching element is coupled to the first and second antenna segments 520, 530 on opposite sides of the RFID chip 510. In one embodiment, the sleeve 550 can be filled with an adhesive 560. Such an adhesive 560 can protect and encapsulate the RFID chip 510 and the connections between the RFID chip 510 and the antenna segments 520, 530.

The tuning/matching element 540 is illustrated generally as a single linear strip, in another embodiment, the tuning/matching element can be arranged in a spiral orientation. Such an arrangement can give more inductance in a shorter length, which can result in a relatively rigid arrangement due to the shorter required length of the sleeve. FIG. 7 schematically illustrates the tuning/matching element 540 in contact with and secured to the first and second antenna segments 520, 530. FIG. 8 is an end view schematically illustrates the tuning/matching element 540 in contact with and secured to the first antenna segment 520. As best illustrated in FIGS. 7 and 8, the tuning/matching element 540 includes a first ring 580 that is positioned around and secured to the first antenna segment 520, and a second ring 590 that is positioned around and secured to the second antenna segment 530. It will be understood that such an arrangement facilitates the assembly of the RFID tag 500.

The foregoing description of examples has been represented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

I claim:

1. An RFID tag comprising:
   an RFID chip;
   a first antenna segment secured to the RFID chip;
   a second antenna segment secured to the RFID chip; and
   a wire segment secured on a first end to the first antenna segment and secured on a second end to the second antenna segment, wherein the first end of the wire segment is wrapped around the first antenna segment and second end of the wire is wrapped around the second antenna segment.

2. The RFID tag of claim 1, wherein the wire segment spans a mounting position of the RFID chip.

3. The RFID tag of claim 1, wherein the wire segment is secured to the first antenna segment and the second antenna segment with ohmic contacts.

4. The RFID tag of claim 3, wherein the ohmic contacts are formed by a conductive adhesive.

5. The RFID tag of claim 3, wherein the ohmic contacts are formed by solder.

6. The RFID tag of claim 3, wherein the ohmic contacts are formed by welding.

7. The RFID tag of claim 1, further comprising:
   a first non-conductive material positioned between the first end of the wire segment and the first antenna segment; and
   a second non-conductive material positioned between the second end of the wire segment and the second antenna segment.

8. The RFID tag of claim 1 further comprising a sleeve positioned over the RFID chip and a portion of the first and second antenna segments.

9. The RFID tag of claim 8, further comprising an adhesive positioned to fill an interior of the sleeve.

10. An RFID tag comprising:
    an RFID chip;
    a first antenna segment secured to the RFID chip;
    a second antenna segment secured to the RFID chip; and
    a tuning and matching element secured on a first end to the first antenna segment and secured on a second end to the second antenna segment, wherein the tuning and matching element includes
      a first ring at the first end,
      a second ring at the second end, and
      a wire section connecting the first ring and the second ring.

11. The RFID tag of claim 10, wherein the tuning and matching element is secured to the first antenna segment by the first ring and secured to the second antenna segment by the second ring.

12. The RFID tag of claim 11, wherein the first ring is positioned around the first antenna segment and the second ring is positioned around the second segment.

13. The RFID tag of claim 10, wherein the wire section is generally a straight segment.

14. The RFID tag of claim 10, wherein the wire section is generally a spiral segment.

15. The RFID tag of claim 10, further comprising a sleeve positioned over the RFID chip and portions of the first antenna segment and the second antenna segment.

16. The RFID tag of claim 15, wherein the tuning and matching element is positioned within the sleeve.

17. The RFID tag of claim 16, further comprising an adhesive positioned to fill the sleeve.

18. The RFID tag of claim 16, wherein the adhesive secures the first and second antenna segments to the RFID chip.

* * * * *